(12) United States Patent
Yu et al.

(10) Patent No.: US 8,488,310 B2
(45) Date of Patent: Jul. 16, 2013

(54) THIN DATA STORAGE DEVICE

(75) Inventors: Hong-Chi Yu, Kaohsiung (TW);
Mao-Ting Chang, Kaohsiung (TW)

(73) Assignee: Walton Advanced Engineering Inc., Kaohsiung (TW)

( * ) Notice: Subject to any disclaimer, the term of this patent is extended or adjusted under 35 U.S.C. 154(b) by 237 days.

(21) Appl. No.: 13/067,539

(22) Filed: Jun. 8, 2011

(65) Prior Publication Data
US 2012/0262871 A1    Oct. 18, 2012

(30) Foreign Application Priority Data

Apr. 15, 2011 (TW) .............................. 100113249 A (51) Int. Cl.
*G06F 1/16* (2006.01)
*H05K 5/00* (2006.01)
*H05K 7/00* (2006.01)
*H05K 1/14* (2006.01)

(52) U.S. Cl.
USPC ..................................... 361/679.32; 361/741

(58) Field of Classification Search
USPC ..................... 361/679.32, 728, 730, 737, 741
See application file for complete search history.

(56) References Cited

U.S. PATENT DOCUMENTS

| | | | | |
|---|---|---|---|---|
| 6,567,273 B1 * | 5/2003 | Liu et al. | ......................... | 361/737 |
| 6,648,224 B2 * | 11/2003 | Lee | ............................... | 235/451 |
| 6,676,420 B1 * | 1/2004 | Liu et al. | ......................... | 439/131 |
| 6,705,891 B1 * | 3/2004 | Lin | ................................ | 439/528 |
| 7,001,192 B1 * | 2/2006 | Yeh | ............................... | 439/131 |
| 7,009,847 B1 * | 3/2006 | Wu et al. | ........................ | 361/737 |
| 7,121,850 B2 * | 10/2006 | Yeh | ............................... | 439/131 |
| 7,136,288 B2 * | 11/2006 | Hoogerdijk | .................... | 361/737 |
| 7,269,004 B1 * | 9/2007 | Ni et al. | ................... | 361/679.41 |
| 7,359,208 B2 * | 4/2008 | Ni | ................................. | 361/752 |
| 7,407,390 B1 * | 8/2008 | Ni | ................................ | 439/76.1 |
| 7,407,393 B2 * | 8/2008 | Ni et al. | ........................ | 439/131 |
| 7,535,719 B2 * | 5/2009 | Hiew et al. | ..................... | 361/737 |
| 7,537,169 B2 * | 5/2009 | Gonzalez et al. | ............. | 235/492 |
| 7,644,867 B2 * | 1/2010 | Lin et al. | ........................ | 235/486 |
| 7,813,137 B2 * | 10/2010 | Gu et al. | ......................... | 361/737 |
| 8,000,104 B2 * | 8/2011 | Kim et al. | ....................... | 361/730 |
| 2005/0130468 A1 * | 6/2005 | Regen et al. | ................... | 439/131 |
| 2006/0164816 A1 * | 7/2006 | Deng | ............................. | 361/737 |
| 2007/0171620 A1 * | 7/2007 | Lee | ................................. | 361/737 |
| 2008/0094807 A1 * | 4/2008 | Hiew et al. | ..................... | 361/737 |
| 2008/0227380 A1 * | 9/2008 | Hsu et al. | ....................... | 454/184 |
| 2008/0266762 A1 * | 10/2008 | Ho et al. | ........................ | 361/679 |
| 2009/0091900 A1 * | 4/2009 | Kang | ............................. | 361/755 |
| 2009/0103271 A1 * | 4/2009 | Wang | ............................. | 361/728 |
| 2010/0077229 A1 * | 3/2010 | Yu et al. | ........................ | 713/193 |

\* cited by examiner

*Primary Examiner* — Hoa C Nguyen
*Assistant Examiner* — Xanthia C Cunningham
(74) *Attorney, Agent, or Firm* — Bacon & Thomas, PLLC (57) ABSTRACT

The present invention is to provide a thin data storage device with a support pad's length positioned at a USB port's height in a way for a supporting segment securely supported and a USB metal contact effectively and electrically connected to a female connector of the USB port without problems such as invalid electrical connection or poor contact between a USB metal contact and a female connector of a computer's USB port affected by the integrated circuit module's thinned thickness. Relying on the lowered thickness of the integrated circuit module, the present invention is effective in extensive applications to other products.

14 Claims, 7 Drawing Sheets

FIG. 1

PRIOR ART

THIN DATA STORAGE DEVICE

BACKGROUND OF THE INVENTION

1) Field of the Invention

The present invention relates to a data storage device, especially to a thin data storage device with a support pad's length positioned at a USB port's height in a way to make a USB metal contact of an integrated circuit module effectively and electrically contact with a computer's USB port.

2) Description of the Prior Art

The Internet era has facilitated information sharing accelerated as well as popularization and progress of information technology. In this regard, a variety of products such as computers and communications & consumer electronics have extensively permeated into consumers' lives.

Recently, the portable data storage device with a data transfer interface and one type of non-volatile memory (for instance, flash memory) integrated has been substantially popularized. On the other hand, a portable device with the USB (Universal Serial Bus) data transfer interface combined which features some advantages such as lightness, portability, and plug-and-play attracts the public's interests.

Figure 1:
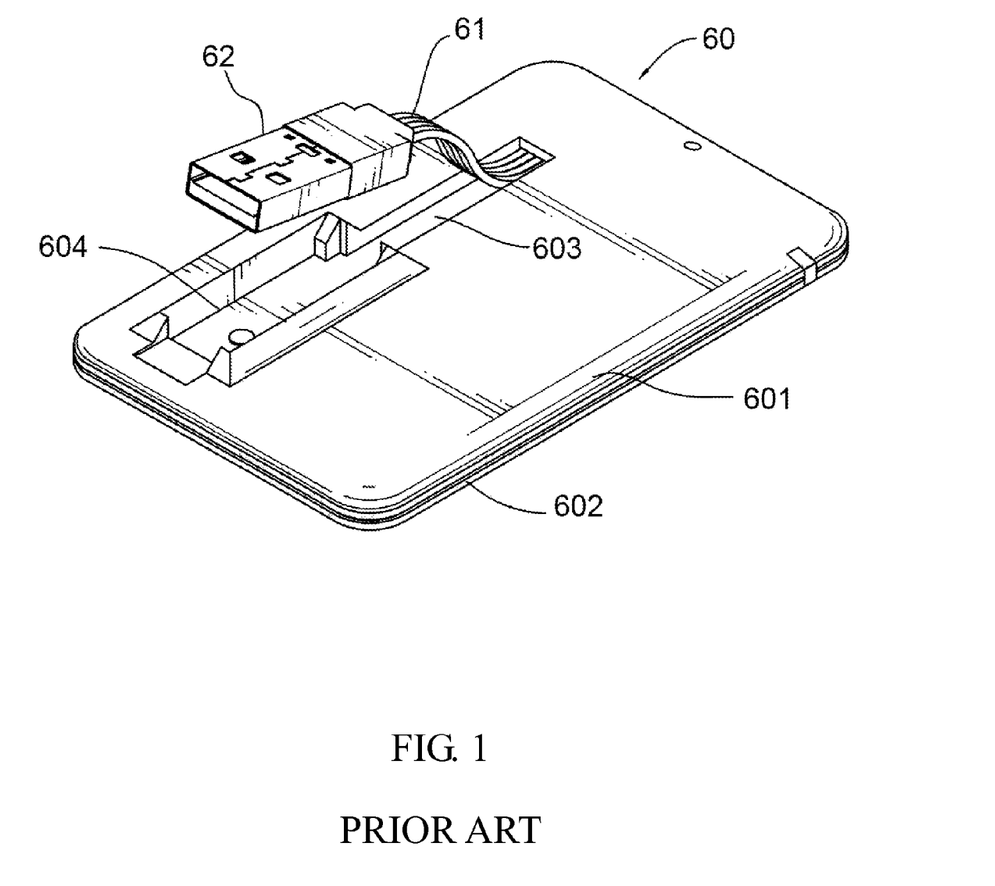
FIG. 1 is one perspective view of a data storage device manufactured in the prior arts.

Accordingly, there are more and more compound products with USB data transfer interfaces integrated available in the market, for instance, the multi-functional data storage device (R.O.C. Patent No. M328060) comprises a flat case (60) manufactured to be a business card with an integrated circuit module installed inside to which a signal cable (61) and a USB (Universal Serial Bus) Series A male connector (62) of the signal cable (61) are connected. The case (60) comprises a first panel (601) and a second panel (602) wherein the first panel (601) is provided with two grooves connected each other such as a narrow wire groove (603) on its surface and a rectangular connector groove (604) to accommodate a USB Series A male connector (62) and the second panel (602) is printed with verified patterns, characters, or trademarks according to each enterprise's (the government's or an individual's) demands for specific matters, advertisements, propaganda or instructions to operate specific matters. As a result, the case similar to a business card for conventional printed advertisements as well as digital data simultaneously combined and expressed makes some specific matters amply and completely displayed.

Figure 2A:
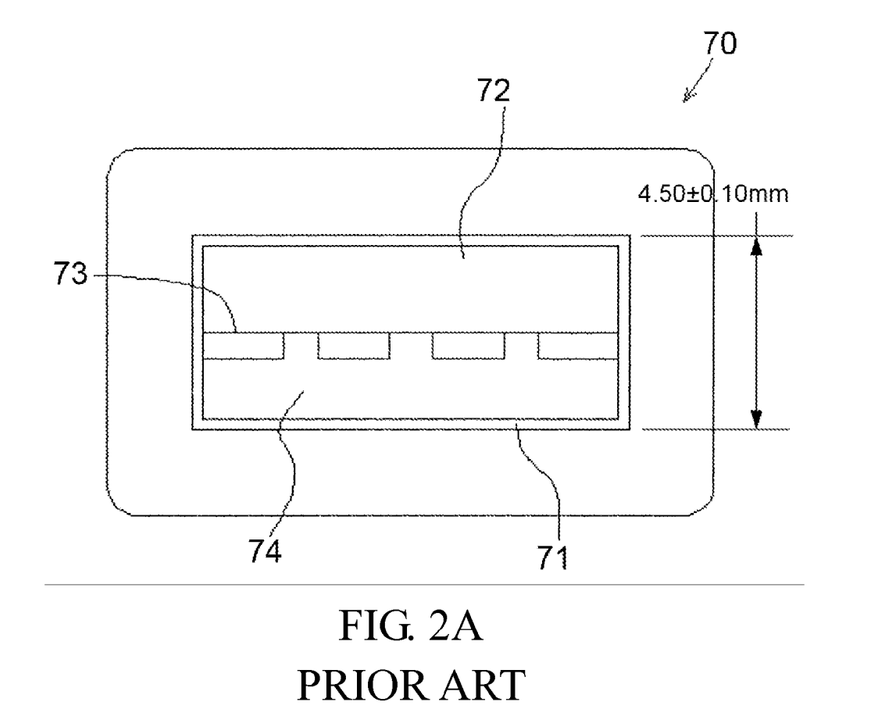
FIG. 2A is one sectional view of the USB Series A male connector.
Figure 2B:
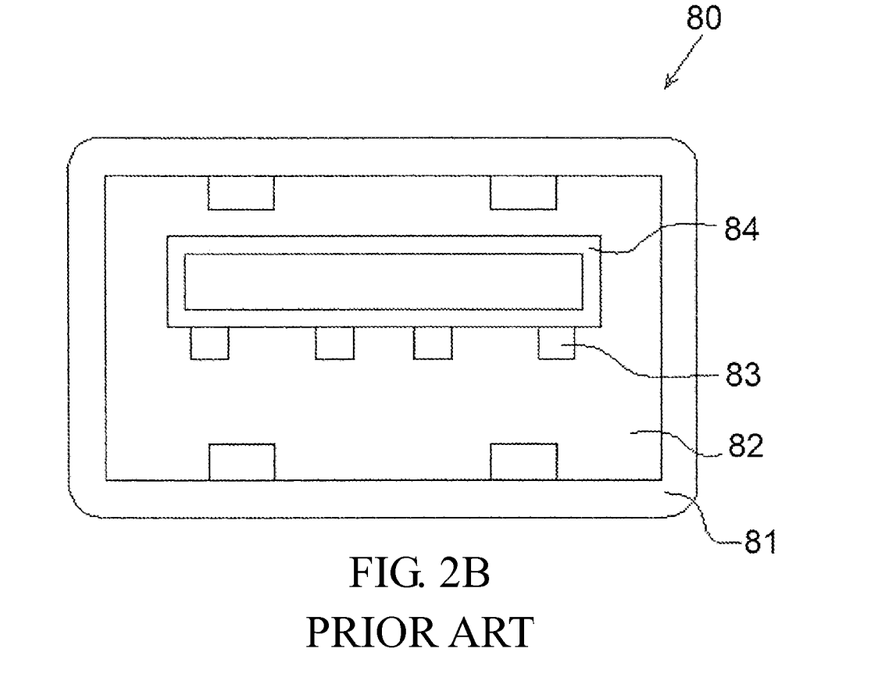
FIG. 2B is one sectional view of the USB Series A female connector.

However, referring to 2A and 2B which illustrate a USB Series A male connector (70) as well as a USB Series A female connector (80) (unit: millimeter) wherein the USB Series A male connector (70) has a metal frame (71) with the thickness of 4.5 mm±0.1 mm and a partial thickness space (72) to accommodate a plurality of metal contacts (83) and a carrier (84) of the female connector (80) according to standards of the USB data transfer interface. Furthermore, a thickness space (82) in the female connector (80) between 2.0 and 2.3 mm is used to accommodate a plurality of metal contacts (73) and a carrier (74) of the male connector (70). That is, the distance from the carrier (84) to the outer frame (81) of the female connector (80) is equal to the minimum thickness of the male connector (70).

Accordingly, the thickness of 4.5 mm±0.1 mm for the male connector (70) along with the metal frame (71) under restrictions of standard specifications cannot be thinner and causes a USB Series A male connector not to be thinner or effectively connected to any other products such as credit card, ATM card, personal ID card (thickness between 1.7 and 1.9 mm), general business card (thickness between 0.3 and 0.5 mm) and promotional cardboard (thickness between 1.0 and 2.0 mm) without other purposes developed despite products based on R.O.C. Patent No. M328060 being available in the market.

SUMMARY OF THE INVENTION

To solve the said problems, the present invention provides a thin data storage device comprising at least an integrated circuit module and a carrier wherein the integrated circuit module has a substrate, at least an electronic device and a USB metal contact and the carrier has a driven structure freely installed within and having a supporting segment and a support pad which is adjacent to the supporting segment for an integrated circuit module carried and had its length positioned at a USB port's height in a way to securely support the supporting segment and deliver the USB metal contact of the integrated circuit module electrically contact with a female connector of the USB port.

The principal object of the present invention is to securely support a supporting segment and allow the USB metal contact of the integrated circuit module electrically to contact with a female connector of the USB port by means of the length of a support pad positioned at the height of a USB port in a way without problems such as invalid electrical connection or poor contact between a USB metal contact and a female connector of a computer's USB port affected by the integrated circuit module's thinned thickness. Relying on the lowered thickness of the integrated circuit module, the present invention is effective in extensive applications to other products.

In order to achieve the purposes hereinbefore, the present invention has the principal technical measures delivered with the technical schemes as follows. As a thin data storage device, the present invention comprises at least an integrated circuit module and a carrier wherein the integrated circuit module has a substrate in which there are an inner surface and an outer surface, at least an electronic device installed on the inner surface or the outer surface, and a USB metal contact installed on the outer surface for the electronic device electrically connected; the carrier comprises a driven structure freely installed within and having a supporting segment and a support pad wherein the supporting segment is adjacent to the support pad and used to carry the integrated circuit module; the support pad has a length greater than or equal to 1.0 mm; characteristics of the present invention are the support pad's movement from the carrier and displacement toward the carrier's one lower surface when the driven structure on which a user's force is applied is shifted in the default direction; then the support pad has its length positioned at the USB port's height in a way and securely supports the supporting segment to make the USB metal contact effectively and electrically contact with a female connector of the USB port as the USB metal contact is electrically connected to a female connector of a computer's USB port.

The objects and the technical issues with respect to the present invention are further delivered with the following technical measures.

In the said thin data storage device, the driven structure has at least one lateral edge provided with at least a sliding element.

In the said thin data storage device, the carrier opposite to the sliding element has one lateral edge provided with a track for the sliding element accommodated and sliding inside.

In the said thin data storage device, the track penetrates at least one lateral edge of the carrier that the sliding element brings along the driven structure to be moved away from the carrier via the track.

In the said thin data storage device, the track does not penetrate at least one lateral edge of the carrier and the sliding element stays in the track.

In the said thin data storage device, the integrated circuit module has its height less than or equal to 1.15 mm.

In the said thin data storage device, the electronic device comprises at least a memory unit and a control unit.

In the said thin data storage device, the USB metal contact is conformable to the specifications of either at least one data transfer interface between the USB 2.0 Series A male connector and the USB 3.0 Series A male connector or a combination of these two data transfer interfaces thereof.

In the said thin data storage device, the integrated circuit module allows the substrate's inner surface to be developed as a package body encasing the electronic device.

In the said thin data storage device, the supporting segment and the support pad designed as one-piece structure are provided with a groove adjacent to their joint.

In the said thin data storage device, the supporting segment and the support pad are designed separately wherein the supporting segment is adjacent to the support pad by a gap and adhered to the support pad via at least an adhesive film.

In the said thin data storage device, the USB metal contact is exposed to the adhesive film.

In the said thin data storage device, the support pad is manufactured in a flexible material.

In the said thin data storage device, there is one interior angle between the supporting segment and the support pad less than 180 degrees when the support pad is moved from the carrier and shifted toward the carrier's lower surface.

In contrast to the prior arts, the present invention allows the support pad's length to posit at the USB port's height in a way for the supporting segment securely supported and the USB metal contact effectively and electrically contacting with a female connector of the USB port without problems such as invalid electrical connection or poor contact between a USB metal contact and a female connector of a computer's USB port affected by the integrated circuit module's thinned thickness. Relying on the lowered thickness of the integrated circuit module, the present invention is effective in extensive applications to other products.

DETAILED DESCRIPTIONS OF THE PREFERRED EMBODIMENTS

In order to ensure purposes, characteristics, and effects of the present invention substantially understood, some preferred embodiments in regard to the present invention are particularly specified as follows. FIGS. 3 to 9 illustrate the principal embodiment of the present invention of a thin data storage device (1).

Figure 3:
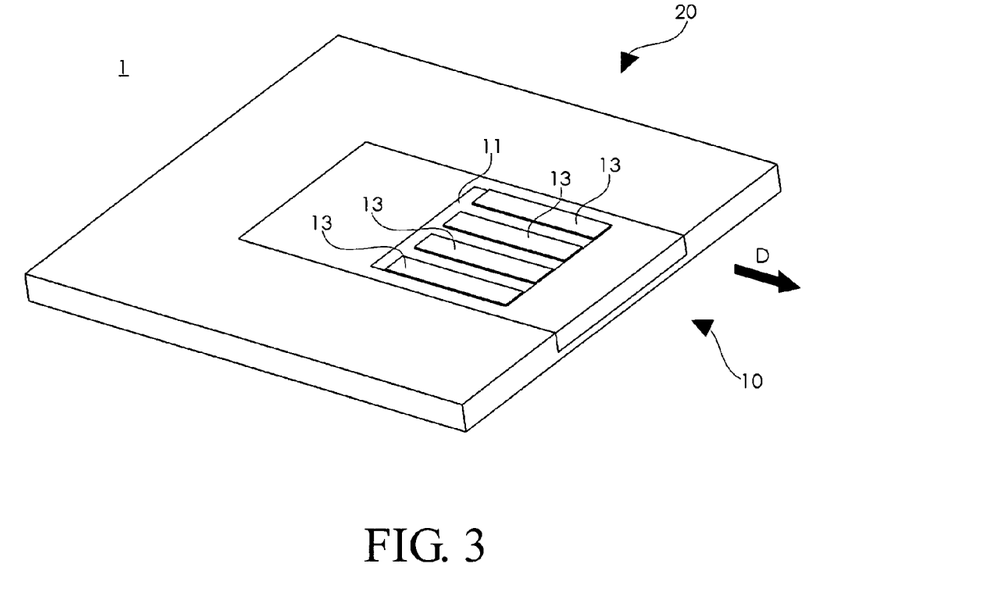
FIG. 3 is one perspective view of the principal embodiment for the present invention of a thin data storage device.
Figure 4:
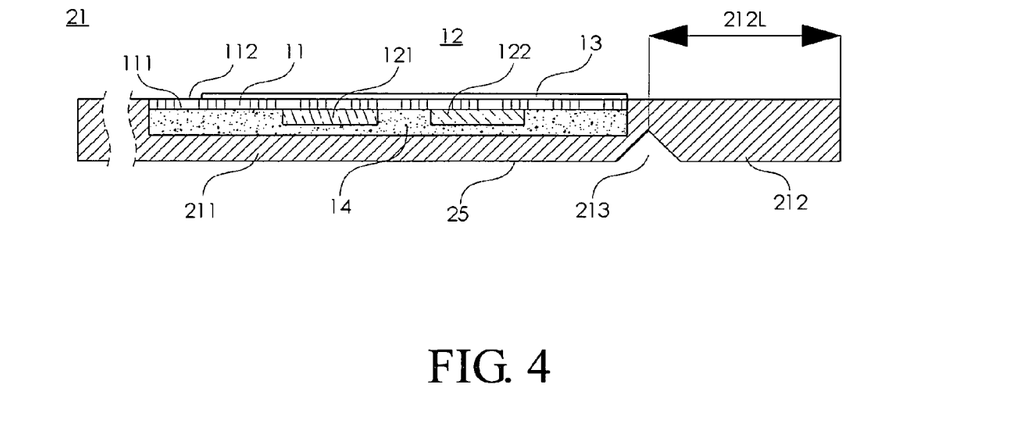
FIG. 4 is one sectional view of the principal embodiment for the present invention of a thin data storage device.

Referring to FIGS. 3 and 4 which illustrate the present invention of a thin data storage device (1) comprising at least an integrated circuit module (10) and a carrier (20) wherein the integrated circuit module (10) is a thin structure with a height less than or equal to 1.15 mm. In this embodiment, there is one integrated circuit module (10) as the example explained. The integrated circuit module (10) could be a Chip-On-Board (COB) package and comprises a substrate (11), at least an electronic device (12) and a USB metal contact (13) wherein the substrate (11) has an inner surface (111) and an outer surface (112) for the said electronic device (12) installed on each of both surfaces thereof and electrically connected to the substrate (11) by means of a wire bonding or a flip chip technique (not shown in figures). In this embodiment, the electronic device (12) is installed on the inner surface (111) of the substrate (11). Furthermore, the USB metal contact (13) is installed on the outer surface (112) of the substrate (11).

Specifically, the substrate (11) could be a high-density double-sided multi-layer printed circuit board with circuits (not shown in figures) developed inside as an interface for transmit of electricity and allows the USB metal contact (13) to be electrically connected to the electronic device (12) via the substrate (11).

In detail, the electronic device (12) comprises at least a memory unit (121) and a control unit (122). The purposes of the memory unit (121) and the control unit (122) which is electrically connected between the memory unit (121) and the USB metal contact (13) are supply of readable/writable digital data and supply of demand/control of data to be imported and exported, respectively. The USB metal contact (13) is plugged into a female connector of a USB port (31) on a computer (3) in favor of exchange of digital data (also shown in FIG. 6).

Preferably, the USB metal contact (13) is compatible to the specifications of either at least one data transfer interface between the USB 2.0 Series A male connector and the USB 3.0 Series A male connector or a combination of these two data transfer interfaces thereof.

Preferably, the inner surface (111) of the substrate (11) on the integrated circuit module (10) is developed to be a package body (14) on which the electronic device (12) is encased.

In addition, passive devices (not shown in figures) necessary to the integrated circuit module (10) are also installed on the inner surface (111) of the substrate (11) and encased inside the package body (14).

Figure 5:
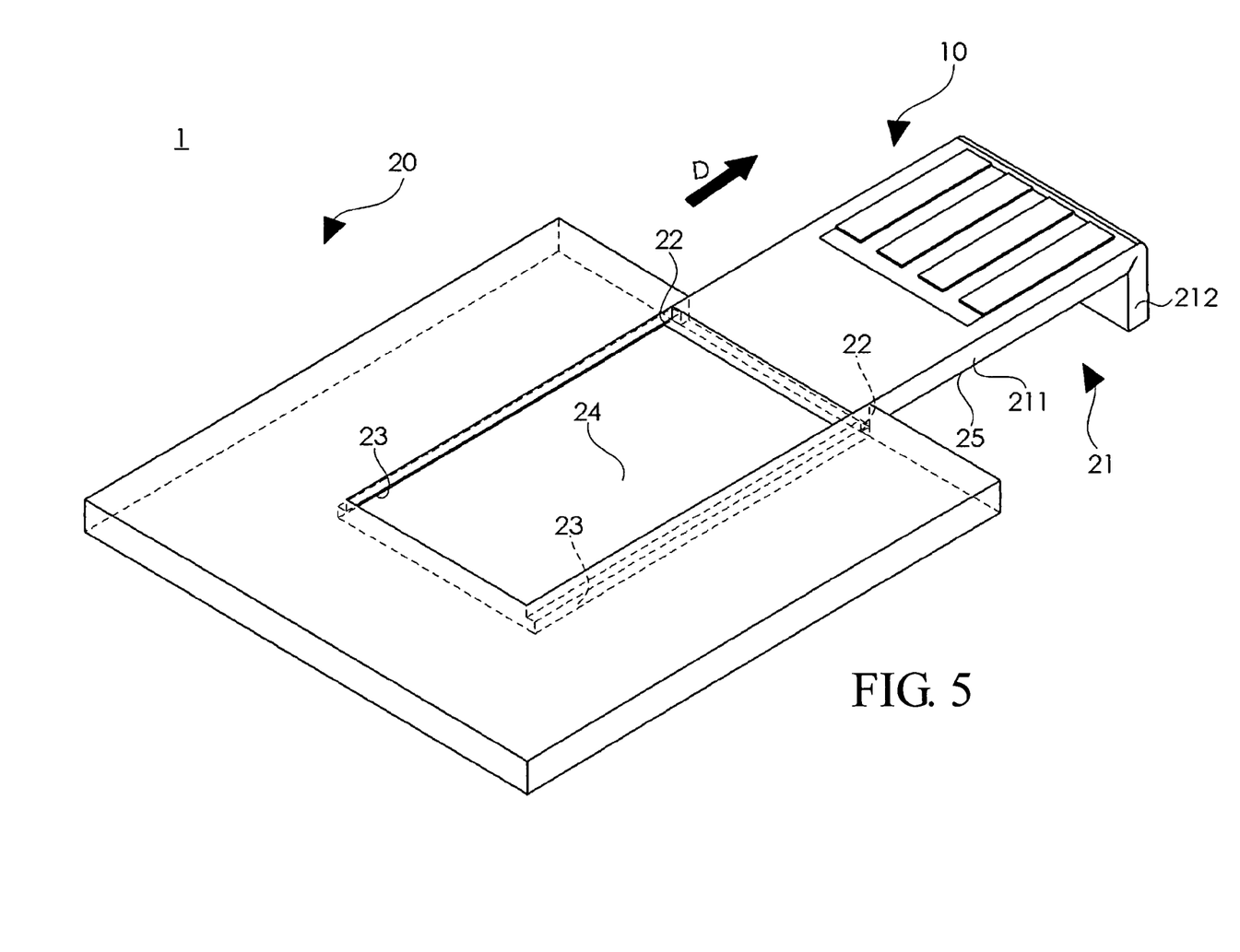
FIG. 5 is one perspective view of the principal embodiment for the present invention of a thin data storage device during operation.
Figure 6:
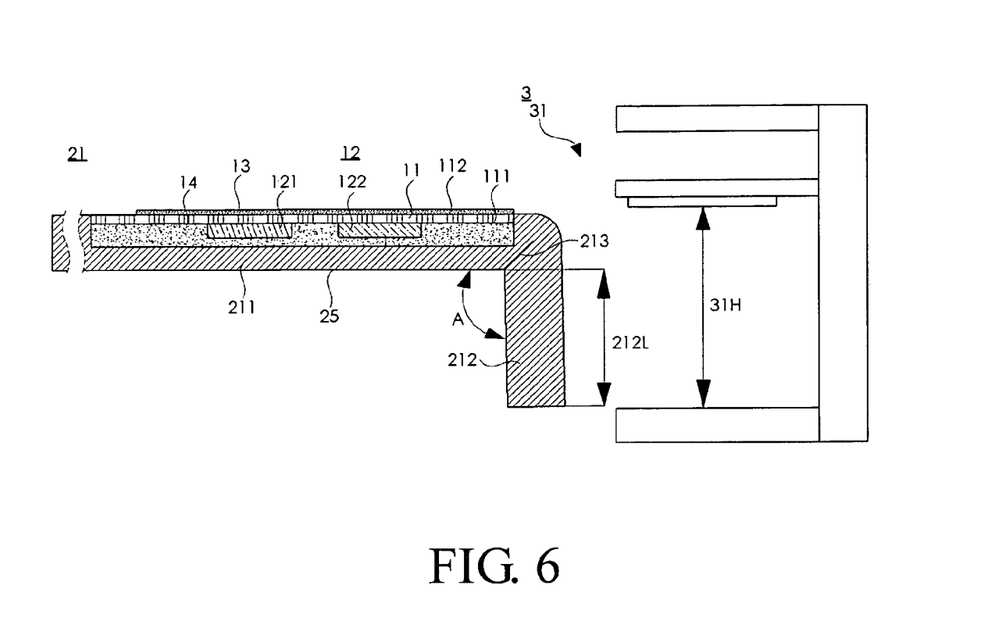
FIG. 6 is one sectional view of the principal embodiment for the present invention of a thin data storage device during operation.
Figure 7:
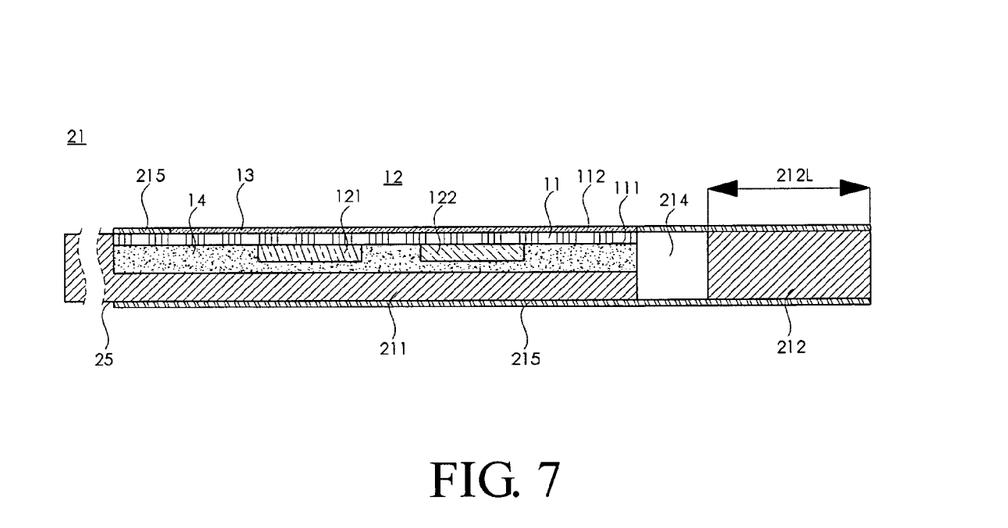
FIG. 7 is another sectional view of the principal embodiment for the present invention of a thin data storage device.

Referring to FIG. 5 which illustrates the carrier (20) comprising a driven structure (21) freely installed in the carrier (20) and having both a supporting segment (211) used to carry the integrated circuit module (10) and a support pad (212) adjacent to the supporting segment (211);

Preferably, referring to FIGS. 4 and 5 which illustrate the supporting segment (211) and the support pad (212) designed as a one-piece structure that is provided with a groove (213)

adjacent to two parts' joint and the groove (213) preferably includes but is not limited to the "Λ" shape. In a further aspect, referring to FIGS. 7 and 8 which illustrate the supporting segment (211) is designed to be separated from but adjacent to the support pad (212) by a gap (214) and further adhered to the support pad (212) with at least an adhesive film (215) which wraps around an area between the supporting segment (211) and the support pad (212) (FIGS. 7 and 8 as examples explained for the present invention) or is horizontally applied between a lower surface of the supporting segment (211) and a lower surface of the support pad (212) (not shown in figures), and the USB metal contact (13) is noticeably exposed to the adhesive film (215) for the USB metal contact (13) electrically contacting with a female connector of the USB port (31) (also shown in FIG. 9);

Accordingly, referring to FIGS. 5 and 6 which illustrate an interior angle (A) between the supporting segment (211) and the support pad (212) less than 180 degrees in favor of the USB metal contact (13) electrically connected to a female connector of a USB port (31) on a computer (3) by one user when the support pad (212) is moved from the carrier (20) and shifted toward a lower surface (25) of the carrier (20). (Details will be further described hereinafter.)

Additionally, referring to FIGS. 4 to 9 which illustrate the length (212L) of the support pad (212) should be greater than or equal to 1.0 mm conformable to the height (31H) of the USB port (31). Preferably, the support pad (212) could be manufactured in a flexible material.

Figure 8:
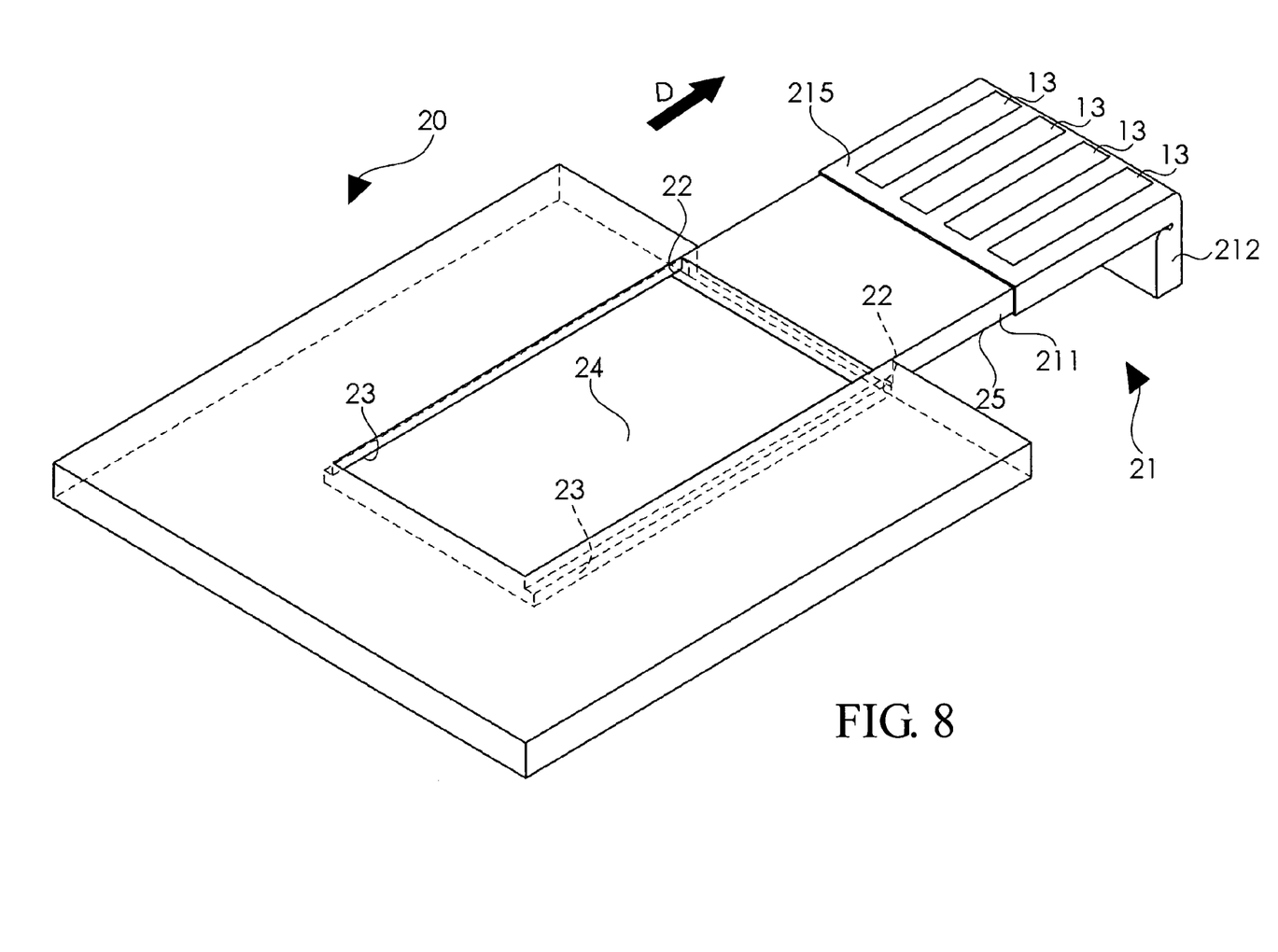
FIG. 8 is another perspective view of the principal embodiment for the present invention of a thin data storage device during operation.
Figure 9:
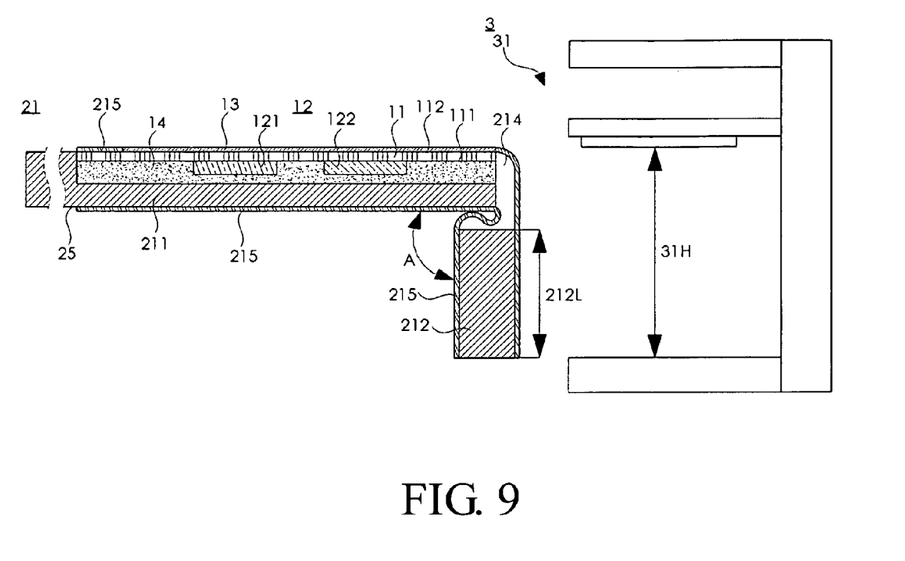
FIG. 9 is another sectional view of the principal embodiment for the present invention of a thin data storage device during operation.

Accordingly, referring to FIG. 5 or 8 which illustrates the support pad (212) is moved from the carrier (20) and shifted toward a lower surface (25) of the carrier (20) by means of the "Λ" shape design (FIG. 4) or a gap (FIG. 7) between the supporting segment (211) and the support pad (212) when the driven structure (21) on which a force is applied by one user is moved in the default direction (D); then, referring to FIG. 6 or 9 which illustrates the length (212L) of the support pad (212) posits at the height (31H) of the USB port (31) in the direction of one force applied by one user who connects the USB metal contact (13) to a female connector of the USB port (31) on a computer (3) for delivering the supporting segment (211) securely supported and making the USB metal contact (13) be effectively and electrically connected to a female connector of the USB port (31).

The "Λ" shape design (FIG. 4) or the gap (FIG. 7) between the supporting segment (211) and the support pad (212) includes an intention of delivering the support pad (212) shifted toward a lower surface (25) of the carrier (20) but is not referred to as one limitation of the present invention. For instance, a flexible element (not shown in figures) which is used to arrange the supporting segment (211) adjacent to the support pad (212) is manufactured in a plastic lamina or an elastic material and makes the support pad (212) be shifted toward a lower surface (25) of the carrier (20) when the support pad (212) is moved from the carrier (20). Therefore, any technical measure known as common sense in this field should not restrict the present invention.

Referring to FIG. 5 or 8 which illustrates there is either at least a sliding element (22) installed on at least one lateral edge of the driven structure (21) or preferably a track (23) provided on one lateral edge of the carrier (20) opposite to the sliding element (22) for the sliding element (22) accommodated and sliding in the track (23).

Specifically, the track (23) does not penetrate at least one lateral edge of the carrier (20) so that the sliding element (22) stays in the track (23) to deliver both a structure assembled by the integrated circuit module (10) as well as the carrier (20) and the present invention properly held by one user.

Alternatively, the track (23) penetrates at least one lateral edge of the carrier (20) so that the sliding element (22) brings along the driven structure (21) to be moved away from the carrier (20) via the track (23) and allows one user employing the integrated circuit module (10) to conveniently complete the USB metal contact (13) electrically connected to a female connector (not shown in figures) of the USB port (31).

Referring to FIG. 5 or 8 again which illustrates the carrier (20) freely installed on the driven structure (21) by means of an accommodating space (24) which does not runs through the carrier (20) for the driven structure (21) securely accommodated inside the carrier (20);

Alternatively, the accommodating space (24) running through the carrier (20) further curtails the height of the carrier (20) which allows the driven structure (21) to be freely accommodated within by means of the sliding element (22) only (not shown in figures).

With the said descriptions summarized, the present invention is to securely support a supporting segment and deliver the USB metal contact effectively and electrically contacting with a female connector of the USB port by means of the length of a support pad positioned at the height of a USB port in a way without problems such as invalid electrical connection or poor contact between a USB metal contact and a female connector of a computer's USB port affected by the integrated circuit module's thinned thickness. Relying on the lowered thickness of the integrated circuit module, the present invention is effective in extensive applications to other products.

Accordingly, the present invention with effects different from general conventional data storage devices and referred to as creative work among products with a similar structure meets patentability and is applied for the patent.

It must be reiterated that the said descriptions are the preferred embodiments of the present invention only, and any equivalent change in specifications, claims, or drawings of the present invention still belongs to the technical field protected by the present invention with reference to claims hereinafter.

What is claimed is:

1. A thin data storage device (1), comprising:
   At least an integrated circuit module (10) provided with
      A substrate (11), at least an electronic device (12) and a USB metal contact (13) wherein the substrate (11) has an inner surface (111) and an outer surface (112) and the electronic device (12) is installed on the inner surface (111) or the outer surface (112) and electrically connected to the USB metal contact (13) located at the outer surface (112);
   A carrier (20), comprising:
      A driven structure (21) freely installed in the carrier (20) and provided with a supporting segment (211) and a support pad (212) wherein the supporting segment (211) is adjacent to the support pad (212) and used to carry the integrated circuit module (10); the support pad (212) has the length (212L) greater than or equal to 1.0 mm;
   Characteristics shown as follows:
   The support pad (212) is moved from the carrier (20) and shifted toward a lower surface (25) of the carrier (20) when the driven structure (21) on which one force is applied by one user is moved in the default direction (D); then the length (212L) of the support pad (212) posits at the height (31H) of the USB port (31) in a way for the supporting segment (211) securely supported and the USB metal contact (13) electrically connected to a female connector of the USB port (31) when the USB metal contact (13) is electrically plugged into a female connector of the USB port (31) on a computer (3).

2. The thin data storage device (1) according to claim 1 wherein the driven structure (21) has at least one lateral edge provided with at least a sliding element (22).

3. The thin data storage device (1) according to claim 2 wherein the carrier (20) opposite to the sliding element (22) has one lateral edge provided with a track (23) in which the sliding element (22) is accommodated and slides.

4. The thin data storage device (1) according to claim 3 wherein the track (23) penetrates at least one lateral edge of the carrier (20) that the sliding element (22) brings along the driven structure (21) moved away from the carrier (20) via the track (23).

5. The thin data storage device (1) according to claim 3 wherein the track (23) does not penetrate at least one lateral edge of the carrier (20) and the sliding element (22) stays in the track (23).

6. The thin data storage device (1) according to claim 1 wherein the integrated circuit module (10) has its height less than or equal to 1.15 mm.

7. The thin data storage device (1) according to claim 1 wherein the electronic device (12) comprises at least a memory unit (121) and a control unit (122).

8. The thin data storage device (1) according to claim 1 wherein the USB metal contact (13) is conformable to specifications of either at least one data transfer interface between the USB 2.0 Series A male connector and the USB 3.0 Series A male connector or a combination of these two data transfer interfaces thereof.

9. The thin data storage device (1) according to claim 1 wherein the inner surface (111) of the substrate (11) on the integrated circuit module (10) is developed to be a package body (14) used to encase the electronic device (12).

10. The thin data storage device (1) according to claim 1 wherein the supporting segment (211) and the support pad (212) are designed as a one-piece structure and provided with a groove (213) at their joint.

11. The thin data storage device (1) according to claim 1 wherein the supporting segment (211) and the support pad (212) are designed to separate parts and the supporting segment (211) is adjacent to the support pad (212) by a gap (214) and adhered to the support pad (212) with at least an adhesive film (215).

12. The thin data storage device (1) according to claim 11 wherein the USB metal contact (13) is exposed to the adhesive film (215).

13. The thin data storage device (1) according to claim 1 wherein the support pad (212) is manufactured in a flexible material.

14. The thin data storage device (1) according to claim 1 wherein there is one interior angle (A) between the supporting segment (211) and the support pad (212) less than 180 degrees when the support pad (212) is moved from the carrier (20) and shifted toward the lower surface (25) of the carrier (20).

* * * * *